Patented Mar. 5, 1929.

1,704,348

UNITED STATES PATENT OFFICE.

LEONARD SMIDTH, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

UREA RESINS AND PROCESS OF MAKING SAME.

No Drawing.   Application filed July 21, 1927.   Serial No. 207,568.

This invention relates to the manufacture of improved condensation products obtained by the reaction of formaldehyde on a urea.

Such products have received much attention of late from chemists. The perfect transparency obtainable together with an unusual elasticity and resistance to shock when hardened, coupled with a high degree of workability to shape both before and after hardening, have made the product a much-to-be desired thing for use in the arts and industries.

My objects are to improve the reliability and the rapidity with which this product can be made, to make it possible to enlarge the scale of operations both in size of shapes produced and the translation from a research to an industrial basis, and at the same time to improve the inherent qualities of the product itself, particularly to improve its resistance to weather conditions.

The condensation products initially yielded by the reaction between these substances contain excess formaldehyde and are soluble in water, but when treated by heat, are gelatinized after a period of time into intermediate products considerably less soluble in water, and finally into products wholly insoluble. These products, although insoluble, are not very resistant either when left in contact with water over a period of time, or when exposed to boiling water for a short period. When exposed to the weather, they usually crack to pieces after a few weeks.

Products with an improved resistance to weather have been prepared by F. Pollak and by the Society for Chemical Industry in Basle. Pollak U. S. Patent No. 1,507,624 adds substances, such as urea, capable of combining with the excess formaldehyde to the water soluble initial condensation products and obtains an improved final product.

The Society of Chemical Industry in Basle, British application No. 249,101, March 1, 1926, (now patented), also adds urea to combine with the excess formaldehyde but improves upon the product of Pollak by adding, at the same time, small amounts of an acid or an acid-yielding substance. When the molecular proportion of urea to formaldehyde in the product is small, e. g., 1.1 to 2, the products so obtained are clear; as the proportion of urea increases, the products become milky and finally opaque like porcelain. The products prepared in this way permit of the more ready separation of the greater part of the water than those made by the method of Pollak's, but are not materially more resistant.

I have found that if thiourea together with an acid or acid-yielding substance is added to the water soluble initial condensation products, instead of urea, a thoroughly resistant product is obtained. Moreover, this thoroughly resistant product can be made with greater certainty, which is to say the reactions can be more readily and reliably brought about, particularly with less danger of forming cloudy or porcelain-like products.

More fully stated, according to my process, two moles of slightly acid formaldehyde are reacted with one mole of urea. Approximately two tenths moles of thiourea with a trace of acid are added any time after the initial condensation is completed (say approximately five minutes afterward). The water is then removed from the mixture by vacuum distillation, but either just before or just after the distillation is complete, a relatively greater amount of acid or an acid-yielding substance is added. The product is then cast or otherwise worked to shape.

Those skilled in this art can readily carry out my invention from this general specification. The following specific example may, however, be useful to those less skilled:

2250 grams urea are heated to boiling with 6400 cubic centimeters of 35% formaldehyde, PH 5.7, under a reflux condenser. After boiling for five minutes, 630 grams thiourea together with one cubic centimeter formic acid are added and heating continued for approximately two hours. It is then filtered and the water removed by vacuum distillation. When nearly all water possible has been removed, 100 cubic centimeters of 10% formic acid is added and distillation continued until as viscous as possible and yet capable of being poured and cast. The product is immediately poured into molds where it soon gelatinizes. The castings are then stripped from the molds and placed in an oven. Sufficient heat is applied to dry them out as rapidly as possible without cracking.

This product and process realize all the objects of my invention and other advantages beside. In line with my objects, I have found the reaction to be most easily and certainly controlled to produce the product free from many defects heretofore present (particularly clouding). The rapidity of production is increased very greatly both by reason of faster reaction and treatment and earlier aging. The weather-resistant qualities are so improved that it will withstand the weather for long periods of time, if not indefinitely. Subjecting to boiling in water and subsequent heating does not deteriorate it. It may be cast or otherwise worked in sheets of as large area as desired without impairment of its fine qualities, or the perfection of the piece. These factors together insure translation from small scale to large scale industrial application.

My invention is subject to the usual modifications without departing from its generic spirit, and the claims are to be interpreted to cover such modifications. Note particularly that the acid or acid-yielding substance specified by me may be any substance having the properties of an acid when in water solution.

I claim:

1. A condensation product of formaldehyde and urea to which thiourea and an acid substance have been added.

2. A condensation product of slightly acid formaldehyde and urea to which thiourea and a trace of an acid substance have been added.

3. The process of making condensation products of formaldehyde and urea which consists in reacting formaldehyde and urea, adding thiourea with an acid substance to the reaction and thereafter removing the water of the reaction.

4. The process of making condensation products of formaldehyde and urea which consists in reacting formaldehyde and urea, adding thiourea with a trace of an acid substance to the reaction and thereafter removing the water of the reaction.

5. The process of making condensation products of formaldehyde and urea which consists in reacting slightly acid formaldehyde and urea, adding thiourea with a trace of an acid, thereupon removing the water, adding a relatively large amount of an acid substance after the water is substantially removed, and shaping the product to the form desired.

6. The process of making condensation products of formaldehyde and urea which consists in reacting formaldehyde and urea, adding thiourea simultaneously with an acid substance to the reaction and thereafter removing the water of the reaction.

7. The process of making condensation products of formaldehyde and urea which consists in reacting formaldehyde and urea, removing the water of the reaction so far as possible, adding a substantial quantity of an acid substance while the product is still viscous, and thereupon pouring the product into molds.

8. The process of making condensation products of formaldehyde and urea which consists in reacting formaldehyde and urea, adding thiourea with formic acid to the reaction and thereafter removing the water of the reaction.

9. The process of making condensation products of formaldehyde and urea which consists in reacting formaldehyde and urea, removing the water of the reaction so far as possible, adding a substantial quantity of formic acid substance while the product is still viscous, and thereupon pouring the product into molds.

10. The process of making condensation products of formaldehyde and urea which consists in reacting two moles of formaldehyde with one mole of urea, adding approximately $\frac{2}{10}$ moles of thiourea with a trace of acid, and thereafter removing the water of the reaction by vacuum distillation.

11. The process of making condensation products of formaldehyde and urea according substantially to the following proportions: heating 2250 grams of urea to boiling with 6400 cubic centimeters of 35% formaldehyde under a reflux condenser, after boiling for five minutes adding 630 grams of thiourea together with one cubic centimeter of acid, continuing the heating for approximately two hours, filtering, removing the water so far as practicable by vacuum distillation, when nearly all the water has been removed adding 100 cubic centimeters of 10% acid continuing the distillation until the product is as viscous as possible yet capable of being poured, and thereupon pouring the products into molds.

In testimony whereof he hereunto affixes his signature.

LEONARD SMIDTH.